United States Patent
Shah et al.

(10) Patent No.: US 6,291,063 B1
(45) Date of Patent: Sep. 18, 2001

(54) FILM CONTAINING SILICON OIL AND ANTIBLOCKING AGENT

(75) Inventors: Gautam Punshibhai Shah, Simpsonville; Gary Joseph Hayes, Anderson, both of SC (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 08/335,433

(22) Filed: Nov. 7, 1994

(51) Int. Cl.$^7$ ................................................ B32B 5/16
(52) U.S. Cl. .................... 428/331; 428/332; 428/447; 428/448; 428/476.9; 428/516
(58) Field of Search .................... 428/516, 447, 428/448, 332, 331, 476.9, 910

(56) References Cited

U.S. PATENT DOCUMENTS

| | | | |
|---|---|---|---|
| 3,399,156 | 8/1968 | Bell | 260/29 |
| 3,547,754 | 12/1970 | Tokos et al. | 161/165 |
| 4,064,296 | 12/1977 | Bornstein et al. | 428/35 |
| 4,302,565 | 11/1981 | Goeke et al. | 526/88 |
| 4,302,566 | 11/1981 | Karol et al. | 526/125 |
| 4,343,852 | 8/1982 | Isaka et al. | 428/216 |
| 4,419,411 | 12/1983 | Park | 428/516 |
| 4,514,465 | * 4/1985 | Schoenberg | 428/339 |
| 4,532,189 | 7/1985 | Mueller | 428/516 |
| 4,551,380 | 11/1985 | Schoenberg | 428/218 |
| 4,618,527 | * 10/1986 | Doyen | 428/213 |
| 4,659,612 | 4/1987 | Balloni et al. | 428/213 |
| 4,692,379 | 9/1987 | Keung et al. | 428/349 |
| 4,716,061 | 12/1987 | Winter | 428/35 |
| 4,724,185 | 2/1988 | Shah | 428/339 |
| 4,755,419 | 7/1988 | Shah | 428/220 |
| 4,956,232 | 9/1990 | Balloni et al. | 428/349 |
| 4,963,419 | 10/1990 | Lustig et al. | 428/36 |
| 5,023,143 | 6/1991 | Nelson | 428/516 |
| 5,110,671 | 5/1992 | Balloni et al. | 428/218 |
| 5,152,946 | 10/1992 | Gillette | 264/230 |
| 5,206,075 | 4/1993 | Hodgson, Jr. | 428/216 |
| 5,272,236 | 12/1993 | Lai et al. | 526/348 |
| 5,278,272 | 1/1994 | Lai et al. | 526/348 |
| 5,298,302 | 3/1994 | Boice | 428/34 |
| 5,508,090 | 4/1996 | Peiffer et al. | 428/214 |

FOREIGN PATENT DOCUMENTS

| | | |
|---|---|---|
| 0317166 | * 11/1987 | (EP) . |
| 615839 | 3/1994 | (EP) . |
| 90/03414 | 4/1990 | (WO) . |
| 93/03093 | 2/1993 | (WO) . |

OTHER PUBLICATIONS

US Determination of Branchinn L. Wild, et al.
US Unrestrained Linear . . . ASTM D 2732.
Transparency of Plastic . . . ASTM D 1746.
US Specular Gloss of . . . ASTM D 2457.

* cited by examiner

Primary Examiner—Leszek Kiliman
(74) Attorney, Agent, or Firm—Rupert B. Hurley, Jr.

(57) ABSTRACT

A film comprises an outer layer which comprises (A) polyolefin, (B) organosiloxane in an amount of from about 0.1 to 1.0 weight percent based on the weight of the outer layer, and (C) a member selected from the group consisting of:

1. antiblocking agent in an amount of from about 0.6 to 3 percent, the antiblocking agent having an average particle size of from about 0.1 to 6 microns;
2. antiblocking agent in an amount of from about 0.4 to 0.59 percent, the antiblocking agent has an average particle size of from about 2 to 4 microns; and
3. antiblocking agent in an amount of from about 0.1 to 0.39 percent, the antiblocking agent has an average particle size of from about 4.1 to 6 microns.

The presence of this composition in the outer layer of the film provides desired film-to-film coefficient of friction, as well as desired processing characteristics, such as absence of surging due to screw slippage, as well as good dispersion of the antiblocking agent.

31 Claims, 1 Drawing Sheet

FILM CONTAINING SILICON OIL AND ANTIBLOCKING AGENT

FIELD OF THE INVENTION

The present invention relates generally to films, both monolayer films and multilayer films, and particularly to packaging films. The present invention also relates to packages, especially packages having one or more seals, as well as packaged products. The present invention is particularly related to films having a relatively low film-to-film coefficient of friction.

BACKGROUND OF THE INVENTION

For some time it has been known to provide a packaging film which contains silicone oil, in an outer film layer and/or an inner film layer. Silicone oil has been sprayed onto the surface of a film, as well as extruded in admixture with one or more polymers which make up the film, including polymer making up an outer layer of a multilayer film. The silicone oil has been used in combination with antiblocking agents, such as particulate silica, to provide a film having a desired coefficient of film-to-metal slip, as well as imparting desired antiblocking characteristics to the film.

It has been discovered that a film having two outer layers, each of which comprises 72.5 weight percent ethylene/propylene copolymer, 15 weight percent polybutylene, and 12.5 weight percent of a masterbatch comprising about 90 weight percent polypropylene (based on masterbatch weight), 4% inorganic antiblock, and 6% of a blend of fatty acid amides (hereinafter, "amides"), if used in a horizontal-form-fill-and-seal operation ("HFFS"), or vertical-form-fill-and-seal operation ("VFFS"), results in an unacceptable amides/antiblock buildup on the machine surface of the HFFS machine, or VFFS machine, because the amides/antiblock buildup sluffs off into the product, and/or hardens and damages the film. The amides/antiblock buildup is caused by the amides, which are extruded in admixture with the polymer of the surface layer, blooming to the surface of the film, in an amount thick enough to result in the buildup on machine surfaces. The antiblock particulates on the surface of the film also accumulate on the machine surfaces, together with the bloomed amides.

However, the fatty acid amides are present in order to provide the film with a desirable film-to-film coefficient of friction, so that packaged products slide freely when in contact with one another. This is desired in order to facilitate alignment of packaged products for the bulk packaging thereof, for example in boxes, as well as providing a desired low film-to-equipment coefficient of friction.

Thus, it would be desirable to provide a film which exhibits a low film-to-film coefficient of friction, as well as a low film-to-equipment/metal coefficient of friction, without buildup of fatty acid amides/antiblock on equipment/metal, and particularly without buildup and subsequent sluffing off into the product being packaged in the film. In order to accomplish this result, it would be desirable to reduce or eliminate the presence of fatty acid amides on the surface of the film, while providing a desired low film-to-equipment coefficient of friction, and while providing a desired low film-to-film coefficient of friction.

SUMMARY OF THE INVENTION

In an effort to produce a film having improved slip characteristics, polydimethylsiloxane, in an amount greater than 1100 parts per million, together with 1100 parts per million erucamide, was blended with a polyolefin, the resulting blend then being extruded to form the film. However, it was discovered that this particular formulation of polyolefin, polydimethylsiloxane, and erucamide, could not be extruded from a single screw extruder, in a manner which produced an acceptable film, because "surging" resulted. That is, during extrusion, the composition comprising polymer, erucamide, and polydimethylsiloxane, oscillated from periods of "slipping", during which the mixture was not being forwarded in spite of the fact that the extruder screw was turning, to periods in which slipping did not occur. Due to the surging, the resulting film exhibited undesirable fluctuations in thickness and silicone oil concentration, and was of unacceptable quality for use as a heat-shrinkable packaging film.

However, it has been discovered that surging does not occur upon extrusion of a composition comprising propylene/ethylene random copolymer in an amount of 88 weight percent, based on total blend weight, together with 1.5 weight percent aluminum silicate antiblocking agent having an average particle size of 0.7 microns, and 0.5 weight percent polydimethysiloxane having a viscosity of 350 centistokes at 25° C. and a specific gravity of 0.973. The film produced using this formulation was discovered to be free of undesirable fluctuations in thickness and organosiloxane concentration, and to have acceptable quality for use as a heat-shrinkable packaging film.

It is believed that the relatively high level of aluminum silicate antiblocking agent prevents the presence of the relatively high level of orgaonsiloxane from causing the intermittent screw slippage which produces surging. Screw slippage and surging have been found to be higher in single screw extruders, as opposed to twin-screw extruders. At the same time that the antiblocking agent decreases screw slippage, the presence of the relatively high level of organosiloxane acts as a dispersant for the relatively high level of aluminum silicate antiblocking agent, thereby allowing the production of a film which is free of visible agglomerates of antiblocking agent. Thus, it is apparent that for the production of packaging films, the silicone oil and antiblocking agent act together to provide a plurality of advantages, each allowing the other to be used, to result in a film having desired coefficients of friction, as well as a uniformity of thickness and organosiloxane concentration, to provide a film of high quality for use as a heat-shrinkable packaging film.

Furthermore, it has been discovered that without the presence of the relatively high level of silicone oil, the relatively high level of the antiblocking agent would result in an undesirable head pressure in the extruder, thereby lowering the extrusion speed, as well as resulting in a higher melt temperature and a lower output rate from the extruder.

It has further been discovered that the above-described film, which comprises specified amounts of antiblocking agent and organosiloxane, can further comprise a relatively low level of fatty acid amide, in order to further enhance the frictional coefficients of the resulting film, as well as reducing the amount of organosiloxane needed to provide the desired film coefficients of friction. It is believed that this relatively low level of fatty acid amide, and reduced level of organosiloxane, in combination with the relatively high amounts of antiblocking agent, decreases the level of fatty acid amide/antiblocking agent buildup on machinery and fatty acid amide/antiblocking agent sluffing off into the product, because the migration rate of fatty acid amide to the film surface, i.e., fatty acid amide "blooming", is directly related to the concentration of the fatty acid amide within the film layer.

As a first aspect, the present invention relates to a film comprising an outer layer. The outer layer comprises (A) polyolefin; (B) a member selected from the group consisting of:

i. antiblocking agent in an amount of from about 0.6 to 3 percent, based on the weight of the outer layer, wherein the antiblocking agent has an average particle size of from about 0.1 to 6 microns; and ii. antiblocking agent in an amount of from about 0.4 to 0.59 percent, based on the weight of the outer layer, wherein the antiblocking agent has an average particle size of from about 2 to 4 microns; and iii. antiblocking agent in an amount of from about 0.1 to 0.39 percent, based on the weight of the outer layer, wherein the antiblocking agent has an average particle size of from about 4.1 to 6 microns; and (C) organosiloxane in an amount of from about 0.1 to 1.0 weight percent, based on the weight of the outer layer.

As a second aspect, the present invention pertains to a multilayer film comprising an inner layer and two outer layers. The inner layer comprises at least one member selected from the group consisting of linear low density polyethylene and linear medium density polyethylene. Each of the outer layers comprises: (A) ethylene/propylene copolymer and propylene homopolymer, wherein the ethylene/propylene copolymer is present in each outer layer in an amount of from about 60 to 90 percent, by weight, based on the weight of the outer layer, and wherein the propylene homopolymer is present in each outer layer in an amount of from about 10 to 30 percent, by weight, based on the weight of the respective outer layer; (B) antiblocking agent; and (C) organosiloxane in an amount of from about 0.1 to 1.0 weight percent, based on the weight of the third layer. The antiblocking agent in each outer layer comprises a member selected from the group consisting of: (B)(i) antiblocking agent in an amount of from about 0.6 to 3 percent, based on the weight of the outer layer, wherein the antiblocking agent has an average particle size of from about 0.1 to 6 microns; and (B)(ii) antiblocking agent in an amount of from about 0.4 to 0.59 percent, based on the weight of the outer layer, wherein the antiblocking agent has an average particle size of from about 2 to 4 microns; and (B)(iii) antiblocking agent in an amount of from about 0.1 to 0.39 percent, based on the weight of the outer layer, wherein the antiblocking agent has an average particle size of from about 4.1 to 6 microns. Finally, the multilayer film has a total free shrink, at 200° F., of from about 12 to 50 percent.

As a third aspect, the present invention pertains to a multilayer film comprising: (A) a first outer layer and a second outer layer, and (B) an inner layer comprising linear low density ethylene/alpha-olefin copolymer. Each of the outer layers comprises at least one member selected from the group consisting of: (i) a blend of ethylene/propylene copolymer and polybutylene; (ii) a blend of propylene homopolymer and propylene/butene copolymer; (iii) a blend of a first propylene copolymer and a second propylene copolymer, wherein the first propylene copolymer is different from the second propylene copolymer and wherein the second propylene copolymer consists of propylene/butene copolymer; (iv) propylene/butene copolymer; and, (v) propylene homopolymer. Furthermore the first outer layer and the second outer layer each further comprise: (a) organosiloxane in an amount of from about 0.1 to 1.0 weight percent, based on the weight of the outer layer; (b) a member selected from the group consisting of: (b)(i) antiblocking agent in an amount of from about 0.6 to 3 percent, based on the weight of the outer layer, wherein the antiblocking agent has an average particle size of from about 0.1 to 6 microns, (b)(ii). antiblocking agent in an amount of from about 0.4 to 0.59 percent, based on the weight of the outer layer, wherein the antiblocking agent has an average particle size of from about 2 to 4 microns, and (b)(iii) antiblocking agent in an amount of from about 0.1 to 0.39 percent, based on the weight of the outer layer, wherein the antiblocking agent has an average particle size of from about 4.1 to 6 microns.

As a fourth aspect, the present invention is directed to a film comprising an outer layer. The outer layer comprises (A) polyolefin, (B) at least one member selected from the group consisting of:

i. antiblocking agent in an amount of from about 0.6 to 3.0 percent, based on the weight of the outer layer, wherein the antiblocking agent has an average particle size of from about 0.1 to 1.9 microns; and ii. antiblocking agent in an amount of from about 0.4 to 0.59 percent, based on the weight of the outer layer, wherein the antiblocking agent has an average particle size of from about 2 to 4 microns; and iii. antiblocking agent in an amount of from about 0.1 to 0.39 percent, based on the weight of the outer layer, wherein the antiblocking agent has an average particle size of from about 4.1 to 6 microns; and (C) organosiloxane in an amount of from about 0.1 to 1.0 weight percent, based on the weight of the outer layer.

DETAILED DESCRIPTION OF THE INVENTION

As used herein, the term "film" is used in a generic sense to include plastic web, regardless of whether it is film or sheet.

As used herein, the term "package" refers to packaging materials used in the packaging of a product.

As used herein, the phrases "seal layer", "sealing layer", "heat seal layer", and "sealant layer", refer to an outer film layer, or layers, involved in the sealing of the film to itself, another film layer of the same or another film, and/or another article which is not a film. It should also be recognized that in general, up to the outer 3 mils of a film can be involved in the sealing of the film to itself or another layer. With respect to packages having only fin-type seals, as opposed to lap-type seals, the phrase "sealant layer" generally refers to the inside film layer of a package, as well as supporting layers within 3 mils of the inside surface of the sealant layer, the inside layer frequently also serving as a food contact layer in the packaging of foods.

As used herein, the term "seal" refers to any seal of a first region of a film surface to a second region of a film surface, wherein the seal is formed by heating the regions to at least their respective seal initiation temperatures. The heating can be performed by any one or more of a wide variety of manners, such as using a hot wire, hot knife, heated bar, hot air, infrared radiation, ultrasonic sealing, etc. More preferably, the seal is formed by hot wire and/or hot knife. As is known to those of skill in the art, a static lap seal is another seal useful in forming a package from the film of the present invention.

As used herein, the phrase "the layer . . . comprising" refers to a film layer which has the recited components throughout the entire cross-section of the layer, as opposed to having one or more of the components sprayed onto the surface of the layer.

As used herein, the term "oriented" refers to a polymer-containing material which has been stretched at an elevated temperature (the orientation temperature), followed by being "set" in the stretched configuration by cooling the material while substantially retaining the stretched dimensions. Upon subsequently heating unrestrained, unannealed, oriented polymer-containing material to its orientation temperature, heat shrinkage is produced. More particularly, the term "oriented", as used herein, refers to oriented films, wherein the orientation can be produced in one or more of a variety of manners.

As used herein, the phrase "orientation ratio" refers to the multiplication product of the extent to which the plastic film material is expanded in several directions, usually two directions perpendicular to one another. Expansion in the machine direction is herein referred to as "drawing", whereas expansion in the transverse direction is herein referred to as "stretching". For films extruded through an annular die, stretching is obtained by "blowing" the film to produce a bubble. For such films, drawing is obtained by passing the film through two sets of powered nip rolls, with the downstream set having a higher surface speed than the upstream set, with the resulting draw ratio being the surface speed of the downstream set of nip rolls divided by the surface speed of the upstream set of nip rolls. The degree of orientation is also referred to as the orientation ratio, or sometimes as the "racking ratio".

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, etc. In general, the layers of a film can consist essentially of a single polymer, or can have still additional polymers together therewith, i.e., blended therewith.

As used herein, the term "homopolymer" is used with reference to a polymer resulting from the polymerization of a single monomer, i.e., a polymer consisting essentially of a single type of repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, propylene, 1-hexene, and 1-octene.

As used herein, the term "polymerization" is inclusive of homopolymerizations, copolymerizations, terpolymerizations, etc., and includes all types of copolymerizations such as random, graft, block, etc. In general, the polymers in the films used in accordance with the present invention, can be prepared in accordance with any suitable polymerization process, including slurry polymerization, gas phase polymerization, and high pressure polymerization processes.

As used herein, the term "copolymerization" refers to the simultaneous polymerization of two or more monomers.

As used herein, a copolymer identified in terms of a plurality of monomers, e.g., "propylene/ethylene copolymer", refers to a copolymer in which either monomer may copolymerize in a higher weight or molar percent than the other monomer or monomers. However, the first listed monomer preferably polymerizes in a higher weight percent than the second listed monomer, and, for copolymers which are terpolymers, quadripolymers, etc., preferably the first monomer copolymerizes in a higher weight percent than the second monomer, and preferably the second monomer copolymerizes in a higher weight percent than the third monomer, etc.

As used herein, copolymers are identified, i.e, named, in terms of the monomers from which the copolymers are produced. For example, the phrase "propylene/ethylene copolymer" refers to a copolymer produced by the copolymerization of both propylene and ethylene, with or without additional comonomer(s).

As used herein, the word "mer" refers to a unit of a polymer, as derived from a monomer used in the polymerization reaction. For example, the phrase "alpha-olefin polymerization units" refers to a unit in, for example, an ethylene/alpha-olefin copolymer, the polymerization unit being that "residue" which is derived from the alpha-olefin monomer after it reacts to become a portion of the polymer chain, i.e., that portion of the polymer contributed by an individual alpha-olefin monomer after it reacts to become a portion of the polymer chain.

As used herein, terminology employing a "/" with respect to the chemical identity of a copolymer (e.g., "an ethylene/alpha-olefin copolymer"), identifies the comonomers which are copolymerized to produce the copolymer. As used herein, "ethylene alpha-olefin copolymer" is the equivalent of "ethylene/alpha-olefin copolymer."

As used herein, the phrase "heterogeneous polymer" refers to polymerization reaction products of relatively wide variation in molecular weight and relatively wide variation in composition distribution, i.e., typical polymers prepared, for example, using conventional Ziegler-Natta catalysts. Heterogeneous polymers are useful in various layers of the film used in the present invention. Although there are a few exceptions (such as TAFMER™ linear homogeneous ethylene/alpha-olefin copolymers produced by Mitsui Petrochemical Corporation, using Ziegler-Natta catalysts), heterogeneous polymers typically contain a relatively wide variety of chain lengths and comonomer percentages.

As used herein, the phrase "heterogeneous catalyst" refers to a catalyst suitable for use in the polymerization of heterogeneous polymers, as defined above. Heterogeneous catalysts are comprised of several kinds of active sites which differ in Lewis acidity and steric environment. Ziegler-Natta catalysts are heterogeneous catalysts. Examples of Ziegler-Natta heterogeneous systems include metal halides activated by an organometallic co-catalyst, such as titanium chloride, optionally containing magnesium chloride, complexed to trialkyl aluminum, as is disclosed in patents such as U.S. Pat. No. 4,302,565, to GOEKE, et. al., and U.S. Pat. No. 4,302,566, to KAROL, et. al., both of which are hereby incorporated, in their entireties, by reference thereto.

As used herein, the phrase "homogeneous polymer" refers to polymerization reaction products of relatively narrow molecular weight distribution and relatively narrow composition distribution. Homogeneous polymers are useful in various layers of the multilayer film used in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts.

More particularly, homogeneous ethylene/alpha-olefin copolymers may be characterized by one or more methods known to those of skill in the art, such as molecular weight distribution ($M_w/M_n$), composition distribution breadth index (CDBI), and narrow melting point range and single melt point behavior. The molecular weight distribution ($M_w/M_n$), also known as polydispersity, may be determined by gel permeation chromatography. The homogeneous ethylene/alpha-olefin copolymers useful in this invention generally has ($M_w/M_n$) of less than 2.7; preferably from about 1.9 to 2.5; more preferably, from about 1.9 to 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes the homogeneous copolymers used in the present invention (narrow composition distribution as assessed by CDBI values generally above 70%) from VLDPEs available commercially which generally have a broad composition distribution as assessed by CDBI values generally less than 55%. The CDBI of a copolymer is readily calculated from data obtained from techniques known in the art, such as, for example, TREF as described, for example, in Wild et. al., *J. Poly. Sci. Poly. Phys. Ed.,* Vol. 20, p.441 (1982). Preferably, the homogeneous ethylene/alpha-olefin copolymers have a CDBI greater than about 70%, i.e., a CDBI of from about 70% to 99%. In general, the homogeneous ethylene/alpha-olefin copolymers in the multilayer films of the present invention also exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point ($T_m$), as determined by Differential Scanning Colorimetry (DSC), of from about 60° C. to 105° C. Preferably the homogeneous copolymer has a DSC peak $T_m$ of from about 80° C. to 100° C. As used herein, the phrase "essentially single melting point" means that at least about 80%, by weight, of the material corresponds to a single $T_m$ peak at a temperature within the range of from about 60° C. to 105° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min. The presence of higher melting peaks is detrimental to film properties such as haze, and compromises the chances for meaningful reduction in the seal initiation temperature of the final film.

A homogeneous ethylene/alpha-olefin copolymer can, in general, be prepared by the copolymerization of ethylene and any one or more alpha-olefin. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing and using homogeneous polymers are disclosed in U.S. Pat. Nos. 5,206,075, 5,241,031, and PCT International Application WO 93/03093, each of which is hereby incorporated by reference thereto, in its entirety. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference thereto, in their respective entireties.

Still another genus of homogeneous ethylene/alpha-olefin copolymers is disclosed in U.S. Pat. Nos. 5,272,236, to LAI, et. al., and 5,278,272, to LAI, et. al., both of which are hereby incorporated by reference thereto, in their respective entireties.

As used herein, the phrase "homogeneous catalyst" refers to a catalyst suitable for use in the polymerization of homogeneous polymers, as defined above. Homogeneous catalysts are also referred to as "single site catalysts", due to the fact that such catalysts typically have only one type of catalytic site, which is believed to be the basis for the homogeneity of the polymers resulting from the polymerization.

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and a non-olefinic comonomer copolymerizable with the olefin, such as vinyl monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/vinyl acetate copolymer, ethylene/ethyl acrylate copolymer, ethylene/butyl acrylate copolymer, ethylene/methyl acrylate copolymer, ethylene/acrylic acid copolymer, ethylene/methacrylic acid copolymer, modified polyolefin resin, ionomer resin, polymethylpentene, etc. Modified polyolefin resin is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of mixtures, blends, etc. of such polymers with other polymers of a different type. More preferably, however, the polyolefin is a the polymerization product of one or more unsubstituted olefins, the polyamide is the polymerization product of one or more unsubstituted amides, etc.

As used herein, the phrase "ethylene alpha-olefin copolymer", and "ethylene/alpha-olefin copolymer", refer to such heterogeneous materials as linear low density polyethylene (LLDPE), and very low and ultra low density polyethylene (VLDPE and ULDPE); and homogeneous polymers such as metallocene-catalyzed EXACT (TM) linear homogeneous ethylene/alpha olefin copolymer resins obtainable from the Exxon Chemical Company, of Baytown, Texas, and TAFMER (TM) linear homogeneous ethylene/alpha-olefin copolymer resins obtainable from the Mitsui Petrochemical Corporation. All these materials generally include copolymers of ethylene with one or more comonomers selected from $C_4$ to $C_{10}$ alpha-olefin such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. The heterogeneous ethylene/alpha-olefin commonly known as LLDPE has a density usually in the range of from about 0.91 grams per cubic centimeter to about 0.94 grams per cubic centimeter. Other ethylene/alpha-olefin copolymers, such as the long chain branched homogeneous ethylene/alpha-olefin copolymers available from The Dow Chemical Company, known as AFFINITY (TM) resins, are also included as another type of homogeneous ethylene/ alpha-olefin copolymer useful in the present invention.

In general, the ethylene/alpha-olefin copolymer comprises a copolymer resulting from the copolymerization of from about 80 to 99 weight percent ethylene and from 1 to 20 weight percent alpha-olefin. Preferably, the ethylene/alpha-olefin copolymer comprises a copolymer resulting from the copolymerization of from about 85 to 95 weight percent ethylene and from 5 to 15 weight percent alpha-olefin.

As used herein, the phrases "inner layer" and "internal layer" refer to any layer, of a multilayer film, having both of its principal surfaces directly adhered to another layer of the film.

As used herein, the phrase "outer layer" refers to any film layer of film having less than two of its principal surfaces directly adhered to another layer of the film. The phrase is inclusive of monolayer and multilayer films. In multilayer films, there are two outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "inside layer" refers to the outer layer, of a multilayer film packaging a product, which is closest to the product, relative to the other layers of the multilayer film. "Inside layer" also is used with reference to the innermost layer of a plurality of concentrically arranged layers simultaneously coextruded through an annular die.

As used herein, the phrase "outside layer" refers to the outer layer, of a multilayer film packaging a product, which is furthest from the product relative to the other layers of the multilayer film. "Outside layer" also is used with reference to the outermost layer of a plurality of concentrically arranged layers simultaneously coextruded through an annular die.

As used herein, the term "adhered" is inclusive of films which are directly adhered to one another using a heat seal or other means, as well as films which are adhered to one another using an adhesive which is between the two films.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer between the two other layers it is between, as well as including a lack of direct adherence to either or both of the two other layers the subject layer is between, i.e., one or more additional layers can be imposed between the subject layer and one or more of the layers the subject layer is between.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

As used herein, the phrase "machine direction", herein abbreviated "MD", refers to a direction "along the length" of the film, i.e., in the direction of the film as the film is formed during extrusion and/or coating.

As used herein, the phrase "transverse direction", herein abbreviated "TD", refers to a direction across the film, perpendicular to the machine direction.

As used herein, the phrase "free shrink" refers to the percent dimensional change in a 10 cm×10 cm specimen of film, when shrunk at 200° F., with the quantitative determination being carried out according to ASTM D 2732, as set forth in the 1990 *Annual Book of ASTM Standards,* Vol. 08.02, pp. 368–371, which is hereby incorporated, in its entirety, by reference thereto. The film according to the present invention preferably has a "total free shrink at 200° F.", i.e., the sum of the free shrink in the machine direction, at 200° F., and the free shrink in the transverse direction, at 200° F., of from about 12 to 50 percent; more preferably, from about 15 to 40 percent; still more preferably, from about 20 to 40 percent. Unless specified otherwise, the phrase "free shrink", as used herein, refers to total free shrink.

As stated above, in the film according to the present invention, the outer film layer(s) comprise polyolefin. Preferably, the polyolefin comprises at least one member selected from the group consisting of polyethylene and polypropylene. Preferably, the polyethylene comprises at least one member selected from the group consisting of linear low density polyethylene (LLDPE), very low density polyethylene (VLDPE), linear medium density polyethylene (LMDPE), high density polyethylene (HDPE), ethylene/vinyl acetate copolymer (EVA), ethylene/butyl acrylate copolymer (EBA), and homogeneous ethylene/alpha-olefin copolymer.

Preferably, the polypropylene comprises at least one member selected from the group consisting of propylene homopolymer, propylene/ethylene random copolymer, and propylene/ethylene/butene terpolymer. Preferably, the propylene/ethylene random copolymer comprises ethylene mer in an amount of from about 0.5 to 30 weight percent, based on the weight of the propylene/ethylene random copolymer; more preferably, ethylene mer in an amount of from about 0.5 to 10 percent, and still more preferably, from about 2 to 6 weight percent. The polypropylene may comprise syndiotactic polypropylene.

Although conventional heterogeneous polymers are disclosed in the Examples, below, the outer layer(s) may further comprise homogeneous polymer, such as homogeneous ethylene/alpha-olefin copolymer.

A particularly preferred outer layer comprises propylene/ethylene copolymer, polybutylene, and homopolymer polypropylene. Another particularly preferred outer layer comprises propylene/ethylene random copolymer and polypropylene homopolymer. Yet another particularly preferred outer layer comprises propylene/ethylene/butene random terpolymer and polybutylene. The outer layer may further comprise butylene homopolymer, i.e., in addition to one or more of the polyolefins described above.

The inner layer(s) of the film preferably comprises ethylene-based polymer, more preferably ethylene/alpha-olefin copolymer, including both heterogeneous ethylene/alpha-olefin copolymer and homogeneous ethylene/alpha-olefin copolymer. Linear low density polyethylene (LLDPE) is a preferred heterogeneous ethylene/alpha-olefin copolymer for use in the core layer.

The antiblocking agent may comprise mineral-based antiblocking agent and/or synthetic-based antiblocking agent. Mineral-based antiblocking agents include both silica-based agents (e.g., diatomaceous earth, quartz, and silica sand), as well as others such as kaolin, talc, feldspar, and calcium carbonate. Synthetic-based antiblocking agents include synthetic silica antiblocking agents, for example gel-type synthetic silica, precipitated-type synthetic silica.

Preferably, the antiblocking agent comprises at least one member selected from the group consisting of silica, silicate, and glass, and preferably the antiblocking agent is in the form of approximately spheroidal particles. Preferably, the antiblocking agent comprises at least one member selected from the group consisting of aluminum silicate (clay), silica (silicon dioxide), sodium calcium alumino silicate, magnesium silicate (talc), and calcium silicate; more preferably, at least one member selected from the group consisting of aluminum silicate, silica, sodium calcium alumino silicate, and magnesium silicate; still more preferably, at least one member selected from the group consisting of aluminum silicate, silica, and sodium calcium alumino silicate; yet still more preferably, at least one member selected from the group consisting of aluminum silicate and silica; and yet still more preferably, aluminum silicate. A preferred antiblocking agents are KAOPOLITE SFO SPECIAL™ blend of kaolin silica having an average particle size of 0.7 microns, obtainable from Kaopolite, Inc., of Union N.J., and SUPER FINE SUPER FLOSS™ silicon dioxide having an average particle size of about 3.5 microns, obtainable from Celite Division, Johns-Manville, of New York, N.Y.

In accordance with the present invention, antiblock particulates having an average particle size of from about 0.1 to 6 microns are preferably present at a level of from about 0.6 to 3 weight percent, based on the weight of the outer layer. However, antiblock particulates having an average particle size of from about 2 to 4 microns provide the desired effects if present at a level of from about 0.4 to 0.59 weight percent, based on the weight of the outer layer. Furthermore, antiblock particulates having an average particle size of from about 4.1 to 6 microns provide desired effects if present at a level of from about 0.1 to 0.39 percent, based on the weight of the outer layer, more preferably, from about 0.2 to 0.39 weight percent. The amount of the antiblocking agent is proportional to the average size of the antiblocking agent particulates. That is, it has been discovered that the larger the particulate, the less is required in order to provide a desired level of antiblocking.

Although the organosiloxane, i.e., silicone oil, may be any organosiloxane, the organosiloxane preferably comprises at least one member selected from the group consisting of polydimethylsiloxane, polymethylphenylsiloxane, olefin-modified silicone, polyether (e.g., polyethylene glycol, polypropylene glycol)-modified silicone, olefin/polyether-modified silicone, epoxy-modified silicone, amino-modified silicone, alcohol-modified silicon, etc. Among these, polydimethylsiloxane is preferred.

Although the organosiloxane is preferably present in the outer layer in an amount of from about 0.1 to 1.0 weight percent based on the weight of the outer layer, more preferably the organosiloxane is present in the outer layer in an amount of from about 0.1 to 0.5 weight percent, still more preferably 0.16 to 0.5 weight percent, and yet still more preferably in an amount of 0.18 to 0.5 weight percent.

Preferably, the outer layer further comprises fatty amide in an amount of from about 0.1 to 1 percent, based on the weight of the outer layer; more preferably, from about 0.2 to 0.6 percent; still more preferably, from about 0.2 to 0.4 percent. Preferably, the fatty amide comprises at least one member selected from the group consisting of primary fatty amide, secondary fatty amide, tertiary fatty amide, fatty alkanolamide, and fatty bisamide. More specifically, the fatty amide preferably comprises at least one member selected from the group consisting of erucamide, stearamide, oleamide, behenamide, and ethylene bisstearamide.

Fatty amides are described in detail in Arthur L. McKenna, "Fatty Amides" (1992, Witco Chemical Corporation), which is hereby incorporated by reference thereto, in its entirety.

Although the film preferably has a film-to-film coefficient of friction of from about 0.1 to 0.9, more preferably the film has a film-to-film coefficient of friction of from about 0.1 to 0.7, still more preferably, from about 0.1–0.5, and yet still more preferably, from about 0.1 to 0.3.

Although the film of the present invention can be either a monolayer film or a multilayer film, preferably the film is a multilayer film. Preferably, the film has a total thickness of less than about 20 mils, more preferably the film has a total thickness of from about 0.2 to 10 mils, still more preferably from about 0.3 to 4 mils, and yet still more preferably, from about 0.4 to 2 mils.

The measurement of optical properties of plastic films used in packaging, including the measurement of total transmission, haze, clarity, and gloss, is discussed in detail in Pike, LeRoy, "Optical Properties of Packaging Materials", *Journal of Plastic film & sheeting,* Vol. 9, No. 3, pp. 173–180 (July 1993), which is hereby incorporated by reference thereto, in its entirety.

The measurement of all angles of reflected or transmitted light rom a sample is called goniophotometry. A Gardner Goniophotometer is capable of determining total transmission, i.e., measuring light striking at any and all angles, and the reflection or transmission of this light from any angle.

The film clarity can be measured using the method of ASTM D 1746, as set forth in the 1990 *Annual Book of ASTM Standards,* Vol. 08.02, pp. 76–78, which is hereby incorporated, in its entirety, by reference thereto. Haze can be measured using the method of ASTM D 1003, as is discussed below. Gloss can be measured using the method of ASTM D 2457, as set forth in the 1990 *Annual Book of ASTM Standards,* Vol. 08.02, pp. 266–269, which is hereby incorporated, in its entirety, by reference thereto.

Clarity refers to the optical distinctness with which an object can be seen when viewed through the sheet. Clarity may be thought of as the distinctness with which an object appears when viewed through a film. Clarity may also be described as the quality of image formation through a sheet, and depends upon the linearity of the passage of light rays through the material. Small deflections of the light, caused by the scattering centers of the material, bring about a deterioration of the image, i.e., a decrease in clarity, these deflections being much smaller than those registered in haze measurements.

Although the film of the present invention preferably has a clarity of from about 20 percent to 100 percent, more preferably the film has a clarity of from about 40 to 100 percent, still more preferably from about 60 to 100 percent, and still more preferably, from 80 to 100 percent.

Some of the multilayer films of the present invention are preferably irradiated to induce crosslinking. In the irradiation process, the film is subjected to an energetic radiation treatment, such as corona discharge, plasma, flame, ultraviolet, X-ray, gamma ray, beta ray, and high energy electron treatment, which induce cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking the polymer present in the film.

To produce crosslinking, a suitable radiation dosage of high energy electrons, preferably using an electron accelerator, with a dosage level being determined by standard dosimetry methods. Other accelerators such as a Van de Graaf generator or resonating transformer may be used. The radiation is not limited to electrons from an accelerator since any ionizing radiation may be used. The ionizing radiation can be used to crosslink the polymers in the film. Preferably, the film is irradiated at a level of from 2–15 MR, more preferably 2–10 MR. As can be seen from the descriptions of preferred films for use in the present invention, the most preferred amount of radiation is dependent upon the film composition, thickness, etc., and its end use.

The above-specified amount of antiblocking agent with the above-specified amount of organosiloxane can be used in one or more outer layers of a wide variety of film and sheet materials. More specifically, the antiblocking agent and organosiloxane can be used in any one or more of the films disclosed in: U.S. Pat. No. 4,532,189, issued Jul. 30, 1985 to W. B. Mueller; U.S. Pat. No. 4,551,380 issued Nov. 5, 1985 to J. H. Schoenberg; U.S. Pat. No. 4,724,185 issued Feb. 9, 1988 to G. P. Shah; U.S. Pat. No. 4,755,419 issued Jul. 5, 1988 to G. P. Shah; U.S. Pat. No. 5,023,143 issued Jun. 11, 1991 to M. Nelson; U.S. Pat. No. 5,298,302, issued Mar. 29, 1994 to P. R. Boice; and, European Application No. 0588667, to G. P. Shah, entitled "Moisture Barrier Film", published Mar. 23, 1994, each of which is hereby incorporated by reference thereto, in its entirety. In addition to the above listed patents, the present invention is especially useful in symmetrical three-layer films, and symmetrical five-layer films, each having propylene-based outer layers and at least one ethylene-based inner layer. These diverse films include barrier films as well as non-barrier films, irradiated as well as non-irradiated films, symmetrical and non-symmetrical films, films containing adhesive layers, films containing one or more interior functional layers, and multilayer as well as monolayer films.

Figure 1:
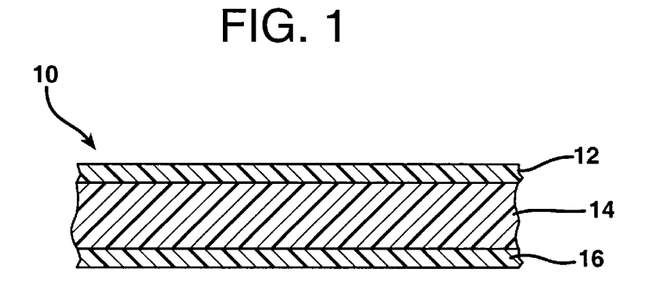
FIG. 1 illustrates a schematic cross-sectional view of a preferred multilayer film according to the present invention.

FIG. 1 illustrates a cross-sectional view of a preferred three-layer film 10. First layer 12 is an outer film layer which serves as a sealing layer, and either an abuse layer or a product contact layer. Second layer 14 is an inner film layer which serves as a bulk layer. Third layer 16 is also an outer layer, and also serves as a sealing layer as well as an abuse layer or a product contact layer. In the preferred film illustrated in FIG. 1, first layer 12 and third layer 16 are of substantially identical chemical composition and substantially identical thickness, so that multilayer film 10 has a substantially symmetrical cross-section. Outer layers 12 and 16 each comprise antiblocking agent and organosiloxane in accordance with the present invention, and inner layer 14 comprises polyolefin in accordance with the present invention.

Figure 2:
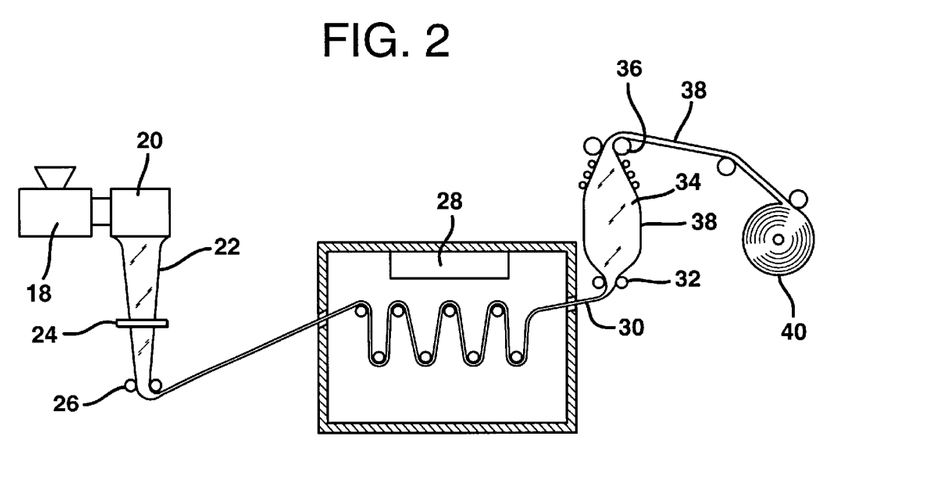
FIG. 2 illustrates a schematic view of a process for producing multilayer films in accordance with the present invention.

A preferred method for making the film of the present invention is as set forth in U.S. Pat. Nos. 4,532,189, and 5,298,302. FIG. 2 illustrates a schematic of a preferred process for making the films of the present invention, e.g., the film of FIG. 1, described above. As illustrated in FIG. 2, individual resin components or blends which are to form each layer are fed to extruders 18 (for simplicity, only one extruder is illustrated). Inside extruder 18, the polymer beads are forwarded, melted, and degassed, following which the resulting bubble-free melt is forwarded into die head 20, and extruded through an annular die, resulting in tape 22, in the form of a tubing, tape 22 preferably having a thickness of about 5–50 mils. Tape 22 is then rapidly cooled to room temperature (optionally by water spray from cooling ring 24) and thereafter collapsed by pinch rolls 26. Although tape 22 can be irradiated, tape 22 is preferably not irradiated because polypropylene, a preferred polymer for use in the film, degrades with radiation. However, in the event that the film comprises only polymers which do not degrade upon irradiation, it may be preferred to irradiate the tape.

Tape 22 is then heated to a preferred orientation temperature by means 28 for radiant heating (e.g., infrared radiation) and/or conductive heating (e.g., superheated steam) and/or convective heating (e.g., heated air). A preferred orientation temperature is from about 75° C. to 175° C., more preferably from about 90° C. to 160° C.

After reaching the desired orientation temperature, heated tape 30 is directed through pinch rolls 32, following which heated tape 30 is inflated, resulting in trapped bubble 34. Using this bubble technique, which is well known to those of skill in the art, internal air pressure stretches heated tape 30 in an amount of from about 1.5× to 8× in the transverse direction (preferably from about 3× to 7×). Simultaneously, roller speed differential, i.e., between pinch rolls 32 and 36, simultaneously draws heated tape 30 in an amount of from about 1.5× to 8× in the machine direction (preferably from about 3× to 7×). In this manner, biaxially oriented film 38 is formed. Biaxially oriented film 38 is then rapidly cooled using chilled air, in order to maintain the degree of biaxial orientation. Finally, biaxially oriented film 38 is wound onto take-up roll 40.

EXAMPLES

The invention is illustrated by the following examples, which are provided for the purpose of representation, and are not to be construed as limiting the scope of the invention. Unless stated otherwise, all percentages disclosed above are based on weight.

The following resins were employed in the Examples set forth below.

PEC: PD 9302™ propylene/ethylene random copolymer having 3.3% by weight of ethylene, obtained from the Exxon Chemical Americas, of Houston, Tex.

PB: 0 300™ polybutylene homopolymer having a density of 0.915 g/cc, obtained from the Shell Chemical Company, of Hahnville, La.

PP: PD 4062E-7™ polypropylene homopolymer having a density of 0.90 g/cc, also obtained from the Exxon Chemical Americas.

ABB: KAOPOLITE SFO SPECIAL™ blend of kaolin silica having an average particle size of 0.7 microns with approximately 4% by weight of fatty acid amides, obtained from Kaopolite, Inc., of Union, N.J.

SO: SF 18-350™ polydimethylsiloxane (i.e., silicone oil), obtained from the General Electric Company of Waterford, N.Y.

FA1: KEMAMIDE E™ fatty amide of erucic acid, obtained from the Witco Corp., Humko Chemical Division, of Charlotte, N.C.

FA2: KEMAMIDE W-40™ N-N'-ethylene-bis-stearamide (a fatty amide), also obtained from the Witco Corp.

MO: KAYDOL™ white mineral oil, also supplied by Witco Corp.

LLDPE: DOWLEX 2045™ linear low density polyethylene, a heterogeneous ethylene/octene copolymer having a density of 0.920 g/cc and a melt index of 1.1, obtained from The Dow Chemical Company, of Midland, Mich.

MB: a masterbatch of approximately 90% by weight of PP, approximately 4% by weight of ABB, and approximately 6% by weight of a blend of fatty acid amides.

Example 1

A film having the following structure and percent layer thicknesses was coextruded:

| 88% PEC | LLDPE | 88% PEC |
|---|---|---|
| 10% PP | | 10% PP |
| 1.5% ABB | | 1.5% ABB |
| 0.5% SO | | 0.5% SO |
| 20% | 60% | 20% |

Following extrusion and cooling the film structure was oriented 5×, in both in the machine and transverse directions, using a hot air trapped bubble method. The final oriented film had a thickness of 0.57 mils.

Example 2

A film having the following structure and percent layer thicknesses was coextruded:

| 98% PEC | LLDPE | 98% PEC |
|---|---|---|
| 1.5% ABB | | 1.5% ABB |
| 0.5% SO | | 0.5% SO |
| 20% | 60% | 20% |

Following extrusion and cooling the film structure was oriented 5×, in both in the machine and transverse directions, using a hot air trapped bubble method. The final oriented film had a thickness of 0.57 mils.

Example 3

A film having the following structure and percent layer thicknesses was extruded:

| 97.5% PEC | LLDPE | 97.5% PEC |
|---|---|---|
| 1.5% ABB | | 1.5% ABB |
| 0.5% SO | | 0.5% SO |
| 0.5% FA2 | | 0.5% FA2 |
| 20% | 60% | 20% |

Following extrusion and cooling the film structure was oriented 5×, in both in the machine and transverse directions, using a hot air trapped bubble method. The final oriented film had a thickness of 0.57 mils.

Example 4

A film having the following structure and percent layer thicknesses was extruded:

| 87.5% PEC | LLDPE | 87.5% PEC |
|---|---|---|
| 10.6% PP | | 10.6% PP |
| 1.5% ABB | | 1.5% ABB |
| 0.1% SO | | 0.1% SO |
| 0.1% FA1 | | 0.1% FA1 |
| 0.1% FA2 | | 0.1% FA2 |
| 0.1% MO | | 0.1% MO |
| 20% | 60% | 20% |

Following extrusion and cooling the film structure was oriented 5×, in both in the machine and transverse directions, using a hot air trapped bubble method. The final oriented film had a thickness of 0.57 mils.

Example 5

A film having the following structure and percent layer thicknesses was extruded:

| 87.5% PEC | LLDPE | 87.5% PEC |
|---|---|---|
| 10.6% PP | | 10.6% PP |
| 1.5% ABB | | 1.5% ABB |
| 0.2% SO | | 0.2% SO |
| 0.1% FA1 | | 0.1% FA1 |
| 0.1% MO | | 0.1% MO |
| 20% | 60% | 20% |

Following extrusion and cooling the film structure was oriented 5×, in both the machine and transverse directions, using the hot air trapped bubble method. The final oriented film had a thickness of 0.57 mils.

Example 6

A film having the following structure and percent layer thicknesses was extruded:

| | | |
|---|---|---|
| 87.5% PEC | LLDPE | 87.5% PEC |
| 10.7% PP | | 10.7% PP |
| 1.5% ABB | | 1.5% ABB |
| 0.2% SO | | 0.2% SO |
| 0.1% FA1 | | 0.1% FA1 |
| 20% | 60% | 20% |

Following extrusion and cooling the film structure was oriented 5× in both the machine and transverse directions, using the hot air trapped bubble method. The final oriented film had a thickness of 0.55 mils.

Example 7

A film having the following structure and percent layer thicknesses was extruded:

| | | |
|---|---|---|
| 87.5% PEC | LLDPE | 87.5% PEC |
| 10.6% PP | | 10.6% PP |
| 1.5% ABB | | 1.5% ABB |
| 0.1% SO | | 0.1% SO |
| 0.2% FA1 | | 0.2% FA1 |
| 0.1% MO | | 0.1% MO |
| 20% | 60% | 20% |

Following extrusion and cooling the film structure was oriented 5× in both the machine and transverse directions, using the hot air trapped bubble method. The final oriented film had a thickness of 0.57 mils.

Comparative Example 8

A film having the following structure and percent layer thicknesses was extruded:

| | | |
|---|---|---|
| 87.5% PEC | LLDPE | 87.5% PEC |
| 12.5% MB | | 12.5% MB |
| 20% | 60% | 20% |

Following extrusion and cooling the film structure was oriented 5× in both the machine and transverse directions, using the hot air trapped bubble method. The final oriented film had a thickness of 0.57 mils. This product is made with silicone oil (i.e., polydimethylsiloxane) sprayed onto the inside surface of the tape, immediately after extrusion.

Analysis of Films of Examples 1–8

The films of Examples 1–3 and Comparative Example 8 were evaluated for hot and cold slip characteristics, optical properties, and machinability. To evaluate hot and cold slip characteristics a series of boxes were packaged with the films of Examples 1, 2, 3, and 8 respectively, on a Weldotron 1611, a packaging machine which employs a hot air shrink tunnel, under tunnel conditions of 300° F. and 60 percent tunnel speed. Immediately following packaging the boxes were stacked and subjectively evaluated for hot slip. After cooling the boxes were again stacked and evaluated for cold slip. Although the hot and cold slip characteristics were similar for each of Examples 1, 2, 3, and 8, it should be noted that Comparative Example 8 contained a relatively high level of fatty amide, while each of Examples 1, 2, and 3 had a substantially lower level of fatty amide. Furthermore, it was found that the film-to-film coefficient of friction for each of Examples 1, 2, and 3 was more consistent relative to the film-to-film coefficient of friction for Comparative Example 8.

Example 9

A film having the following structure and percent layer thicknesses was extruded:

| | | |
|---|---|---|
| 73% PEC | LLDPE | 73% PEC |
| 15% PB | | 15% PB |
| 10% PP | | 10% PP |
| 1.5% ABB | | 1.5% ABB |
| 0.5% SO | | 0.5% SO |
| 25% | 50% | 25% |

Following extrusion and cooling the film structure was oriented 5× in each of the machine and transverse directions, using the hot air trapped bubble method. The final oriented film had a thickness of 0.57 mils.

Example 10

A film having the following structure and percent layer thicknesses was extruded:

| | | |
|---|---|---|
| 83% PEC | LLDPE | 83% PEC |
| 15% PB | | 15% PB |
| 1.5% ABB | | 1.5% ABB |
| 0.5% SO | | 0.5% SO |
| 25% | 50% | 25% |

Following extrusion and cooling the film structure was oriented 5× in both the machine and transverse directions, using the hot air trapped bubble method. The final oriented film had a thickness of 0.57 mils.

Example 11

A film having the following structure and percent layer thicknesses was extruded:

| | | |
|---|---|---|
| 72.5% PEC | LLDPE | 72.5% PEC |
| 15% PB | | 15% PB |
| 10.7% PP | | 10.7% PP |
| 1.5% ABB | | 1.5% ABB |
| 0.2% SO | | 0.2% SO |
| 0.1% FA1 | | 0.1% FA1 |
| 25% | 50% | 25% |

Following extrusion and cooling the film structure was oriented 5× in both the machine and transverse directions, using the hot air trapped bubble method. The final oriented film had a thickness of 0.57 mils.

Comparative Example 12

A film having the following structure and percent layer thicknesses was extruded:

| | | |
|---|---|---|
| 72.5% PEC | LLDPE | 72.5% PEC |
| 15% PB | | 15% PB |
| 12.5% MB | | 12.5% MB |
| 25% | 50% | 25% |

Following extrusion and cooling the film structure was oriented 5× in both the machine and transverse directions, using the hot air trapped bubble method. The final oriented film had a thickness of 0.57 mils.

Analysis of Films of Examples 9–12

The films of Examples 9 and 10 and Comparative Example 12 were evaluated for hot and cold slip characteristics, optical properties, and machinability. The film of Example 11 could not be tested because of inadequate film quality caused by processing difficulties unrelated to the composition of the surface layers. To evaluate hot and cold slip characteristics a series of boxes were packaged with the films of Examples 9, 10, and 12, respectively, on a Weldotron 1611, a packaging machine which employs a hot air shrink tunnel, under tunnel conditions of 300° F. and 40 percent tunnel speed. Immediately following packaging the boxes were stacked and subjectively evaluated for hot slip. After cooling the boxes were again stacked and evaluated for cold slip.

Although the hot and cold slip characteristics were similar for each of Examples 9, 10, 11, and 12, it should be noted that Comparative Example 12 contained a relatively high level of fatty amide, while each of Examples 9, 10, and 11 had a substantially lower level of fatty amide. Furthermore, it is believed that the film-to-film coefficient of friction for each of Examples 9, 10, and 11 is more consistent relative to the film-to-film coefficient of friction for Comparative Example 12.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

What is claimed is:

1. A film comprising an outer layer, the outer layer comprising:
    (A) polyolefin;
    (B) a member selected from the group consisting of:
        (i) antiblocking agent in an amount of from about 0.6 to 3 percent, based on the weight of the outer layer, wherein the antiblocking agent has an average particle size of from about 0.1 to 6 microns; and
        (ii) antiblocking agent in an amount of from about 0.4 to 0.59 percent, based on the weight of the outer layer, wherein the antiblocking agent has an average particle size of from about 2 to 4 microns; and
        (iii) antiblocking agent in an amount of from about 0.1 to 0.39 percent, based on the weight of the outer layer, wherein the antiblocking agent has an average particle size of from about 4.1 to 6 microns; and
    (C) organosiloxane in an amount of from about 0.1 to 1.0 weight percent, based on the weight of the outer layer.

2. The film according the claim 1, wherein the film has a clarity of from about 20 percent to 100 percent.

3. The film according the claim 1, wherein the film has a total thickness of from about 0.2 to 10 mils.

4. The film according to claim 1, wherein the film has a film-to-film coefficient of friction of from about 0.1 to 0.7.

5. The film according to claim 1, wherein the antiblocking agent comprises at least one member selected from the group consisting of aluminum silicate (clay), silica (silicon dioxide), sodium calcium alumino silicate, magnesium silicate (talc), and calcium silicate.

6. The film according the claim 1, wherein the film has a total free shrink of from about 15 to 40 percent.

7. The film according to claim 6, wherein the film is biaxially-oriented.

8. The film according to claim 1, wherein the film is biaxially-oriented.

9. The film according the claim 1, wherein the polyolefin comprises polyethylene.

10. The film according to claim 9, wherein:
    the polyethylene comprises at least one member selected from the group consisting of linear low density polyethylene, very low density polyethylene, linear medium density polyethylene, high density polyethylene, ethylene/vinyl acetate copolymer, ethylene/butyl acrylate copolymer, homogeneous ethylene/alpha-olefin copolymer.

11. The film according the claim 1, wherein the polyolefin comprises polypropylene.

12. The film according to claim 11, wherein the polypropylene comprises at least one member selected from the group consisting of propylene homopolymer, propylene/ethylene random copolymer, and propylene/ethylene/butene terpolymer.

13. The film according to claim 11, wherein the polyolefin comprises propylene/ethylene random copolymer.

14. The film according to claim 13, wherein the propylene/ethylene random copolymer comprises ethylene mer in an amount of from about 0.5 to 30 weight percent, based on the weight of the propylene/ethylene random copolymer.

15. The film according to claim 14, wherein the propylene/ethylene random copolymer comprises ethylene mer in an amount of from about 2 to 6 weight percent, based on the weight of the propylene/ethylene random copolymer.

16. The film according to claim 13, wherein the polyolefin further comprises polypropylene homopolymer.

17. The film according to claim 13, wherein the polyolefin further comprises polybutylene.

18. The film according to claim 13, wherein the propylene/ethylene random copolymer comprises propylene/ethylene/butene random terpolymer.

19. The film according to claim 18, wherein the polyolefin further comprises polypropylene homopolymer.

20. The film according to claim 19, wherein the polyolefin further comprises at least one member selected from the group consisting of polybutylene and propylene/butylene copolymer.

21. The film according to claim 1, wherein the outer layer further comprises fatty amide in an amount of from about 0.1 to 1 percent, based on the weight of the outer layer.

22. The film according to claim 21, wherein the fatty amide comprises at least one member selected from the group consisting of primary fatty amide, secondary fatty amide, tertiary fatty amide, fatty alkanolamide, and fatty bisamide.

23. The film according to claim 22, wherein the fatty amide comprises at least one member selected from the group consisting of erucamide, stearamide, oleamide, behenamide, and ethylene bisstearamide.

24. The film according the claim 1, wherein the film is a multilayer film.

25. The multilayer film according to claim 24, wherein the outer layer is a first film layer, and the multilayer film further comprises second film layer, and the second film layer comprises polyethylene.

26. The multilayer film according to claim 25, wherein the first layer is a first outer layer and the second layer is an inner layer, the film further comprising a third layer, the third layer being an second outer layer, the second outer layer comprising:
    (A) polyolefin;
    (B) a member selected from the group consisting of:
        (i) antiblocking agent in an amount of from about 0.6 to 3 percent, based on the weight of the third layer, wherein the antiblocking agent has an average particle size of from about 0.1 to 6 microns; and
(ii) antiblocking agent in an amount of from about 0.4 to 0.59 percent, based on the weight of the third layer, wherein the antiblocking agent has an average particle size of from about 2 to 4 microns; and
(iii) antiblocking agent in an amount of from about 0.1 to 0.39 percent, based on the weight of the third layer, wherein the antiblocking agent has an average particle size of from about 4.1 to 6 microns; and (C) organosiloxane in an amount of from about 0.1 to 1.0 weight percent, based on the weight of the third layer.

27. The multilayer film according to claim 26, wherein the multilayer film is substantially symmetrical with respect to both layer thickness and layer chemical composition.

28. The multilayer film according to claim 27, wherein the multilayer film is a three layer film.

29. A multilayer film comprising:

an inner layer comprising at least one member selected from the group consisting of linear low density polyethylene or linear medium density polyethylene;

two outer layers, each of the outer layers comprising:
(A) ethylene/propylene copolymer and propylene homopolymer, wherein the ethylene/propylene copolymer is present in each outer layer in an amount of from about 60 to 90 percent, by weight, based on the weight of the outer layer, and wherein the propylene homopolymer is present in each outer layer in an amount of from about 10 to 30 percent, by weight, based on the weight of the respective outer layer;
(B) a member selected from the group consisting of:
(i) antiblocking agent in an amount of from about 0.6 to 3 percent, based on the weight of the third layer, wherein the antiblocking agent has an average particle size of from about 0.1 to 6 microns; and
(ii) antiblocking agent in an amount of from about 0.4 to 0.59 percent, based on the weight of the third layer, wherein the antiblocking agent has an average particle size of from about 2 to 4 microns; and
(iii) antiblocking agent in an amount of from about 0.1 to 0.39 percent, based on the weight of the third layer, wherein the antiblocking agent has an average particle size of from about 4.1 to 6 microns; and
(C) organosiloxane in an amount of from about 0.1 to 1.0 weight percent, based on the weight of the third layer; and wherein the multilayer film has a total free shrink, at 200° F., of from about 12 to 50 percent.

30. A multilayer film, comprising:
(A) a first outer layer and a second outer layer, wherein each of the outer layers comprises at least one member selected from the group consisting of:
(i) a blend of ethylene/propylene copolymer and polybutylene;
(ii) a blend of propylene homopolymer and propylene/butene copolymer;
(iii) a blend of a first propylene copolymer and a second propylene copolymer, wherein the first propylene copolymer is different from the second propylene copolymer and wherein the second propylene copolymer consists of propylene/butene copolymer; and
(iv) propylene/butene copolymer; and
(v) propylene homopolymer; and
wherein the first outer layer and the second outer layer each further comprise:
(a) organosiloxane in an amount of from about 0.1 to 1.0 weight percent, based on the weight of the outer layer;
(b) a member selected from the group consisting of:
(i) antiblocking agent in an amount of from about 0.6 to 3 percent, based on the weight of the outer layer, wherein the antiblocking agent has an average particle size of from about 0.1 to 6 microns; and
(ii) antiblocking agent in an amount of from about 0.4 to 0.59 percent, based on the weight of the outer layer, wherein the antiblocking agent has an average particle size of from about 2 to 4 microns; and
(iii) antiblocking agent in an amount of from about 0.2 to 0.39 percent, based on the weight of the outer layer, wherein the antiblocking agent has an average particle size of from about 4.1 to 6 microns; and (B) an inner layer comprising linear low density ethylene/alpha-olefin copolymer.

31. A film comprising an outer layer, the outer layer comprising:
(A) polyolefin;
(B) at least one member selected from the group consisting of:
(i) antiblocking agent in an amount of from about 0.6 to 3.0 percent, based on the weight of the outer layer, wherein the antiblocking agent has an average particle size of from about 0.1 to 1.9 microns; and
(ii) antiblocking agent in an amount of from about 0.4 to 0.59 percent, based on the weight of the outer layer, wherein the antiblocking agent has an average particle size of from about 2 to 4 microns; and
(iii) antiblocking agent in an amount of from about 0.1 to 0.39 percent, based on the weight of the outer layer, wherein the antiblocking agent has an average particle size of from about 4.1 to 6 microns; and
(C) organosiloxane in an amount of from about 0.1 to 1.0 weight percent, based on the weight of the outer layer.

* * * * *